(12) United States Patent
Miura et al.

(10) Patent No.: US 7,182,921 B2
(45) Date of Patent: Feb. 27, 2007

(54) CYLINDRICAL STEAM REFORMING UNIT

(75) Inventors: Toshiyasu Miura, Tokyo (JP); Jun Komiya, Tokyo (JP); Hiroshi Fujiki, Tokyo (JP); Naohiko Fujiwara, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 466 days.

(21) Appl. No.: 10/477,663

(22) PCT Filed: Jun. 3, 2002

(86) PCT No.: PCT/JP02/05414

§ 371 (c)(1),
(2), (4) Date: Nov. 10, 2003

(87) PCT Pub. No.: WO02/098790
PCT Pub. Date: Dec. 12, 2002

(65) Prior Publication Data
US 2004/0144029 A1 Jul. 29, 2004

(30) Foreign Application Priority Data
Jun. 4, 2001 (JP) ............................. 2001-168041

(51) Int. Cl.
*B01J 8/00* (2006.01)
*B01J 8/04* (2006.01)
*B01J 7/00* (2006.01)
*B01J 19/00* (2006.01)

(52) U.S. Cl. ................ 422/187; 422/188; 422/189; 422/211; 422/198; 422/129; 422/196; 48/127.9; 48/197 R; 48/61; 48/62 R; 48/128; 48/198.1; 48/198.7; 48/75

(58) Field of Classification Search .............. 422/198, 422/188, 179; 48/61
See application file for complete search history.

(56) References Cited

U.S. PATENT DOCUMENTS 6,291,708 B1 * 9/2001 Cockrem .................... 562/589

(Continued)

FOREIGN PATENT DOCUMENTS

EP 0 199 878 1/1986

(Continued)

*Primary Examiner*—Glenn Caldarola
*Assistant Examiner*—Kaity Handal
(74) *Attorney, Agent, or Firm*—Flynn, Thiel, Boutell & Tanis, P.C.

(57) ABSTRACT

A cylindrical steam reforming unit contains a plurality of cylindrical bodies consisting of a first cylindrical body, a second cylindrical body and a third cylindrical body of successively increasing diameters disposed in concentric spaced relationship, a radiation cylinder disposed within and concentrically with the first cylindrical body, a burner disposed in the radial central portion of the radiation cylinder, and a reforming catalyst layer with a reforming catalyst filled in a gap between the first and second cylindrical bodies, wherein a CO shift catalyst layer and a CO removal catalyst layer are disposed in a gap between the second and third cylindrical bodies, the CO shift catalyst layer being formed in a gap with the direction of flow reversing at one axial end of the reforming catalyst layer and through a heat recovery layer of predetermined length. According to this reforming unit, without internally disposing a heat insulation layer, a cooling mechanism or the like, the reforming catalyst layer, CO shift catalyst layer, and CO removal catalyst layer can be integrated, achieving various useful effects, including size and weight reductions and the shortening of startup time.

10 Claims, 5 Drawing Sheets

U.S. PATENT DOCUMENTS

| | | | |
|---|---|---|---|
| 6,413,479 B1 * | 7/2002 | Kudo et al. | 422/198 |
| 6,497,856 B1 * | 12/2002 | Lomax et al. | 423/651 |
| 2002/0081244 A1 * | 6/2002 | Roth | 422/179 |

FOREIGN PATENT DOCUMENTS

| | | |
|---|---|---|
| JP | 62-27489 | 2/1987 |
| JP | 63-69130 | 5/1988 |
| JP | 1-222902 | 9/1989 |
| JP | 1-282113 | 11/1989 |
| JP | 9-278402 | 10/1997 |
| JP | 2001-146404 | 5/2001 |
| JP | 2002-187705 | 7/2002 |
| WO | WO 00/63114 | 10/2000 |

* cited by examiner

FIG. 1

Embodiment of a first cylindrical steam reforming unit of the invention (reforming unit A)

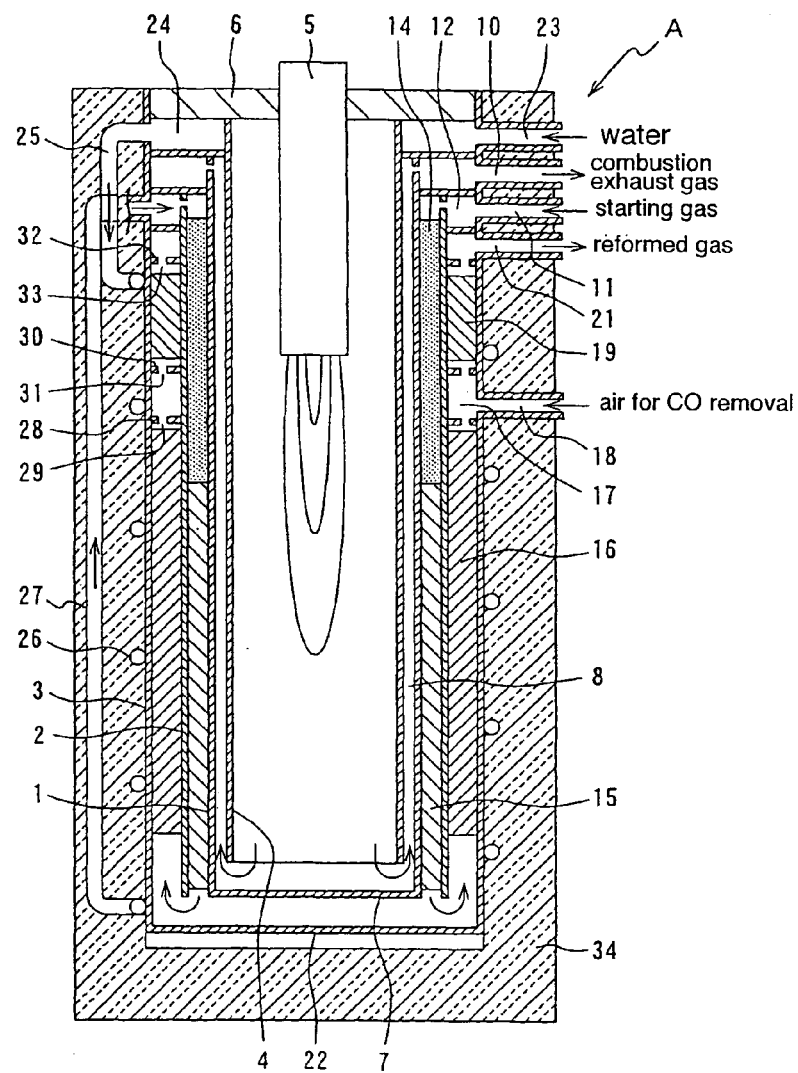

1: first cylindrical body
2: second cylindrical body
3: third cylindrical body
4: heat transfer partition wall = radiation cylinder
14: preheating layer 15: reforming catalyst layer
16: CO shift catalyst layer
19: CO removal catalyst layer
26: heat transfer tube = water heating tube = cooling tube
34: heat insulating member

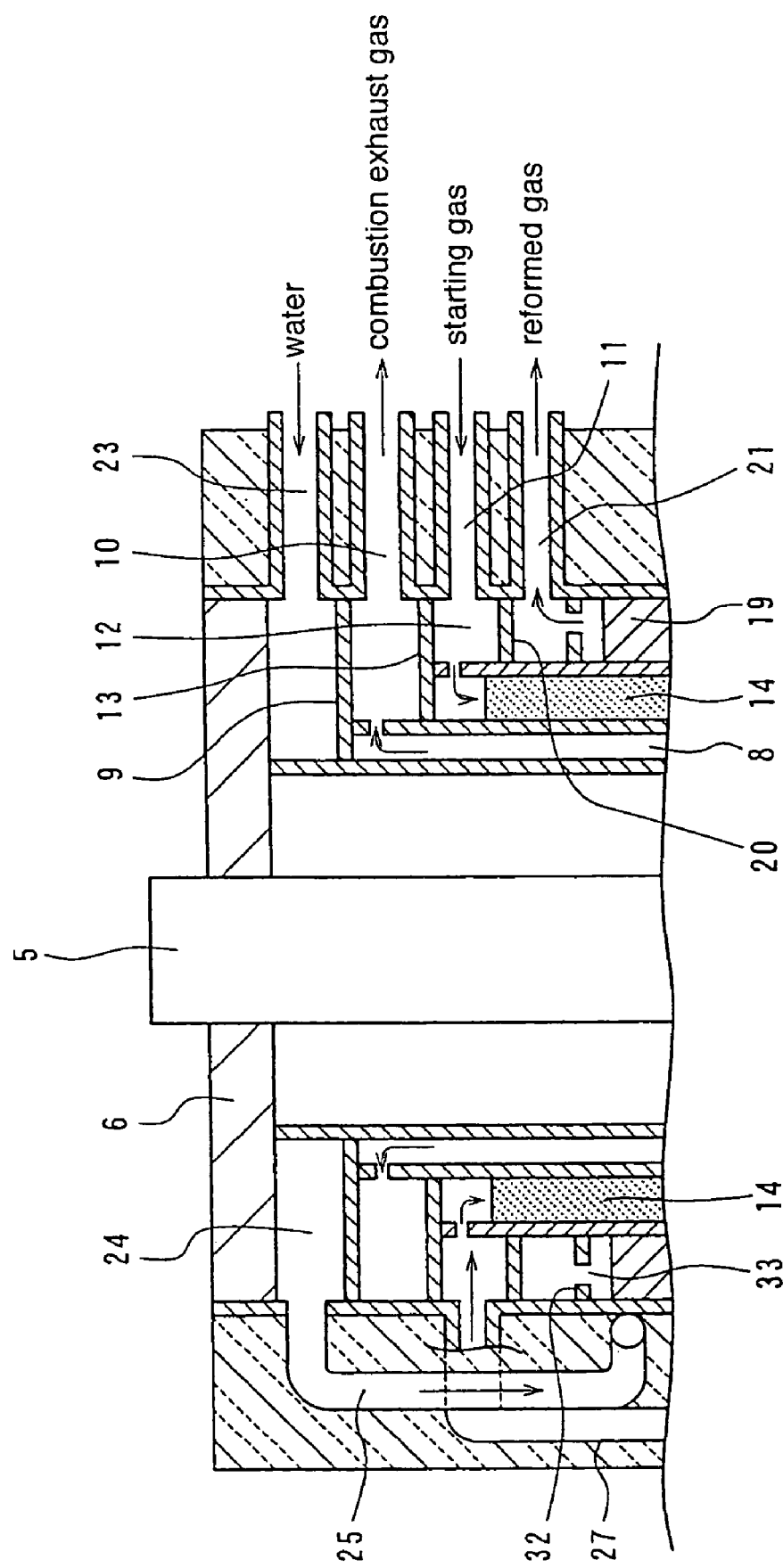

Disposing state of monolithic reforming catalyst

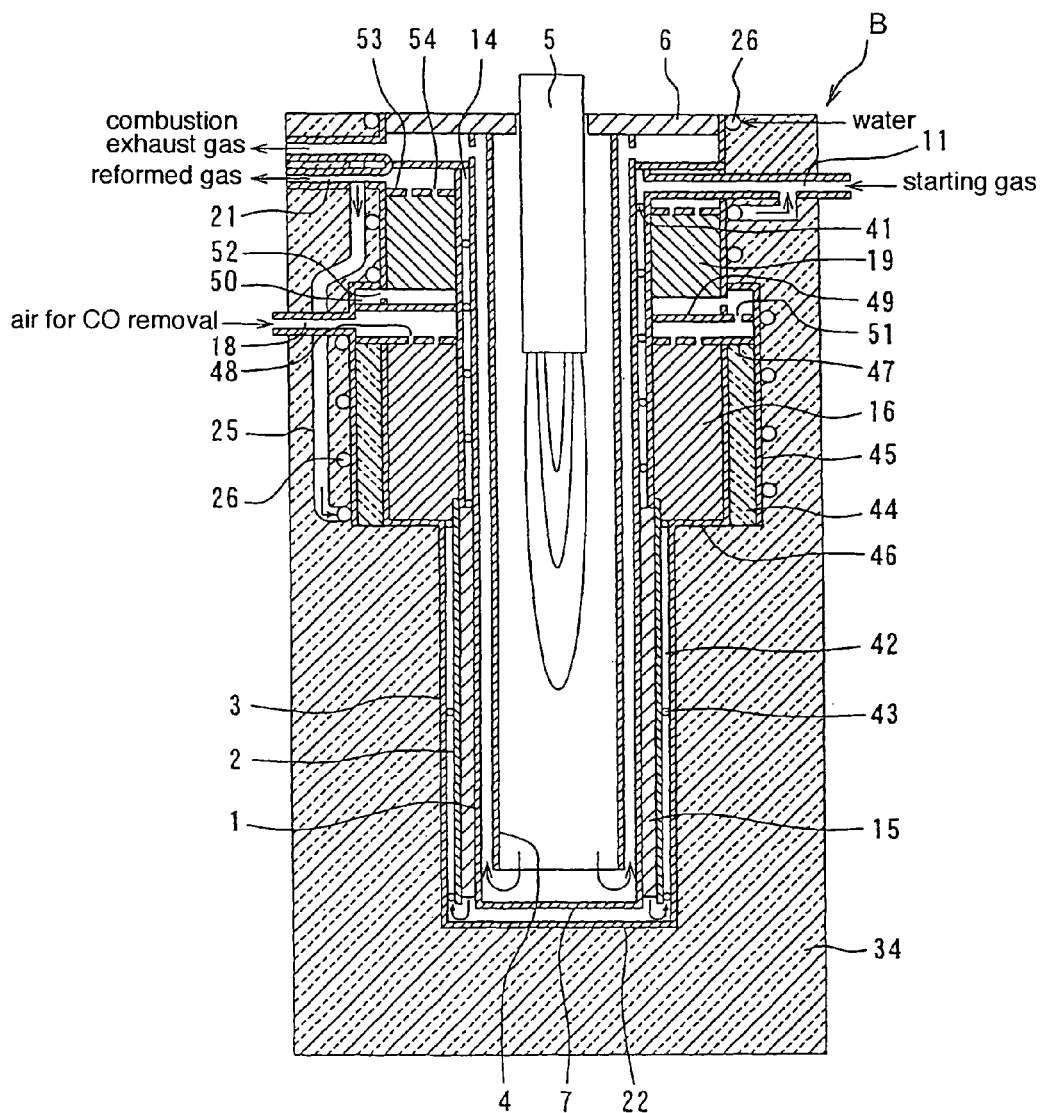

FIG. 4
Embodiment of a second cylindrical steam reforming unit of the invention (reforming unit B)

1: first cylindrical body
2: second cylindrical body
3: third cylindrical body
4: heat transfer partition wall = radiation cylinder
14: preheating layer
15: reforming catalyst layer
16: CO shift catalyst layer
19: CO removal catalyst layer
26: heat transfer tube = water heating tube = cooling tube
34, 44: heat insulating member
42: heat recovery layer Example of a conventional steam reforming unit 69: heat transfer partition wall = radiation cylinder
71: passage of combustion gas
72: preheating layer
73: reforming catalyst layer
74: heat recovery layer
75: CO shift catalyst layer
76: air feed port
77: air mixed layer
78: CO removal catalyst layer
79: heat insulating layer
80: cooling mechanism
81: reformed gas discharge tube

CYLINDRICAL STEAM REFORMING UNIT

TECHNICAL FIELD

This invention relates to a cylindrical steam reforming unit for preparing a reformed gas mainly composed of hydrogen by subjecting, to steam reforming, hydrocarbon fuels such as city gas, LPG and the like and, more particularly, to a cylindrical steam reforming unit used in a Polymer Electrolyte Fuel Cell (PEFC).

TECHNICAL BACKGROUND

For reforming units of steam reforming a starting gas such as a city gas, LPG, a natural gas or the like, a reforming unit described, for example, in WO 00/63114 is known. This reforming unit is one that is used to prepare a reformed gas of a high hydrogen concentration mainly used in a polymer electrolyte fuel cell and as shown in FIG. 5, a burner (70) is disposed at the center of a plurality of cylindrical tubular bodies (61~69) wherein a combustion gas passage (71), a preheating layer (72), a reforming catalyst layer (73), a heat recovery layer (74), a CO shift catalyst layer (75), a CO removal catalyst layer (78) and the like are formed in spaces of the tubular bodies around the burner (70), respectively. However, such a reforming unit has the following problems (1)~(3) and has to be further modified.

(1) This reforming unit needs a heat insulation layer (79), a cooling mechanism (80) and the like in the inside thereof and thus, not only the structure becomes complicated, but also the internal thermal performance is low owing to the fact that because the heat insulation layer (79) and the cooling mechanism (80) are, respectively, interposed between these catalyst layers, the respective catalyst layers are separated from one another and are not contiguous, thereby causing the unit to be delayed in temperature rise upon startup and having the startup time prolonged in practice.

(2) Where a Cu—Zn-based CO shift catalyst is used, for example, as a CO shift catalyst, the Cu—Zn-based CO shift catalyst is so low in heat resistance that for continuous use of this catalyst, it is essential to provide the heat insulation layer (79), the cooling mechanism (80) and the like around the CO shift catalyst layer (75) and suppress the temperature of the CO shift catalyst layer (75) to 300° C. or below. More particularly, the reforming catalyst layer (73) has a temperature of 700° C. or over upon reaction, under which if the heat insulation layer (79) or the cooling mechanism (80) is not provided between the reforming catalyst layer (73) and the CO shift catalyst layer (75), then the temperature of the CO shift catalyst layer (75) is elevated via heat transmission from the reforming catalyst layer (73), resulting in the temperature of the filled CO shift catalyst exceeding its heat-resistant temperature.

(3) Because the usable temperature of the CO shift catalyst layer (75) is limited to 200~300° C., the reaction velocity caused by the catalyst is so low that a large amount of the CO shift catalyst is required, which renders the unit large in size, thereby increasing the weight correspondingly.

In cases where a limitation is not placed on such a reforming unit as set out hereinabove but a reforming unit is employed for fixed type purposes (residential PEFC applications) or for automobiles, it is essential that a reforming system including a reforming unit be small in size and light in weight as a whole. Additionally, various improvements are necessary to make a high efficiency in the practical service conditions, not to mention a startup time upon commencement of operation, or to realize a shortening in the startup time.

The invention has been accomplished in view of such problems as set forth above with respect to the steam reforming unit and has for its object the provision of a cylindrical steam reforming unit which is small in size and light in weight, has good startup characteristics, can be operated at a high thermal efficiency and is able to stably produce hydrogen.

DISCLOSURE OF THE INVENTION

The invention contemplates the provision of cylindrical steam reforming units that can solve the above-stated problems, i.e. to provide a first cylindrical reforming unit and a second cylindrical reforming unit that are, respectively, cylindrical steam reforming units having the following arrangements.

The first cylindrical reforming unit of the invention is directed to a cylindrical steam reforming unit, which comprises a plurality of cylindrical bodies consisting of a first cylindrical body, a second cylindrical body and a third cylindrical body of successively increasing diameters disposed in concentric spaced relationship, a radiation cylinder disposed within and concentrically spaced within the first cylindrical body, a burner disposed at the radial central portion of the radiation cylinder, a reforming catalyst layer with a reforming catalyst filled in a gap radially established between the first and second cylindrical bodies, a CO shift catalyst layer and a CO removal catalyst layer provided in a gap established between the second and third cylindrical bodies provided around said reforming catalyst layer, and the CO shift catalyst layer being formed in a gap with the direction of flow reversed with the reforming catalyst layer at one axial end thereof.

The second cylindrical reforming unit of the invention is directed to a cylindrical steam reforming unit, which comprises a plurality of cylindrical bodies consisting of a first cylindrical body, a second cylindrical body and a third cylindrical body of successively increasing diameters disposed in concentric spaced relationship, a radiation cylinder disposed within and spaced at a central axis thereof concentrically with the first cylindrical body, a burner disposed at the radial central portion of the radiation cylinder, a reforming catalyst layer with a reforming catalyst filled in a gap radially established between the first and second cylindrical bodies, a CO shift catalyst layer and a CO removal catalyst layer provided in a gap established between the second and third cylindrical bodies provided around the reforming catalyst layer, and the CO shift catalyst layer being formed in a gap with the direction of flow reversed with the reforming catalyst layer at one axial end thereof and through a heat recovery layer of predetermined length.

In both cylindrical steam reforming units, a heat transfer tube is disposed around the third cylindrical body and water is passed through the heat transfer tube not only to generate steam for reforming, but also to cool the CO shift catalyst layer and the CO removal catalyst layer.

In the practice of the invention, as set forth hereinabove, the CO shift catalyst layer is disposed at the periphery of the reforming catalyst layer and formed within a space with the direction of flow reversed at one axial end of the reforming catalyst layer. More particularly, the CO shift catalyst layer is formed in a gap established between the second cylindrical and third cylindrical bodies and is so arranged that the gas passage from the reforming catalyst layer reverses at the lower end of the second cylindrical body and communicates with the CO shift catalyst layer. In this way, because heat that is greater than the heat of evaporation required in the heat transfer tube can be supplied (i.e. heat supply that is greater than the heat of evaporation required in the heat transfer tube can be received through the heat transfer from the reforming catalyst layer and also through heat transport with the reformed gas generated in the reforming catalyst layer), the CO shift catalyst can be successively raised from the upstream side of the CO shift catalyst layer. Although, in the reforming unit set forth in the afore-mentioned WO 00/63114, it is necessary to interpose a heat recovery layer (74) and a heat insulating layer (49) and the like between a reforming catalyst layer and a CO shift catalyst layer, such is not necessary in the present invention.

BRIEF DESCRIPTION OF THE DRAWINGS

FIG. 1 and FIG. 2 are views showing an embodiment of a first cylindrical reforming unit according to the invention.

FIG. 4 is a view showing an embodiment of a second cylindrical reforming unit according to the invention.

EMBODIMENTS CARRYING OUT THE INVENTION

Figure 3:
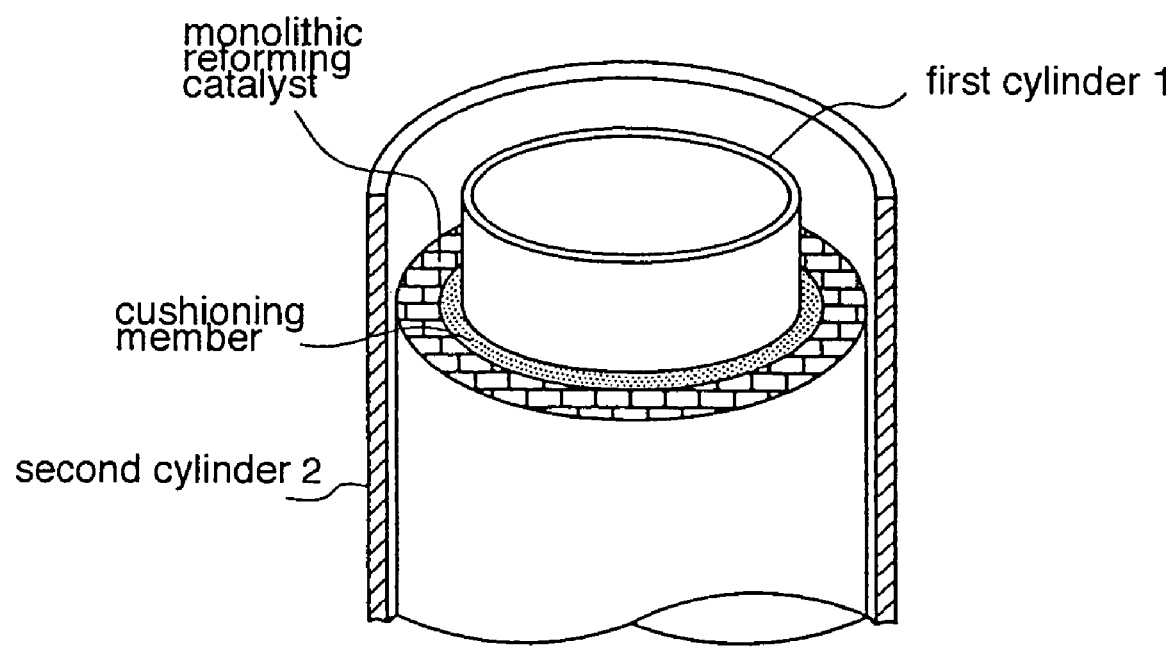
FIG. 3 is a view showing an embodiment wherein a monolithic reforming catalyst is used as a reforming catalyst layer of a cylindrical reforming unit.
Figure 5:
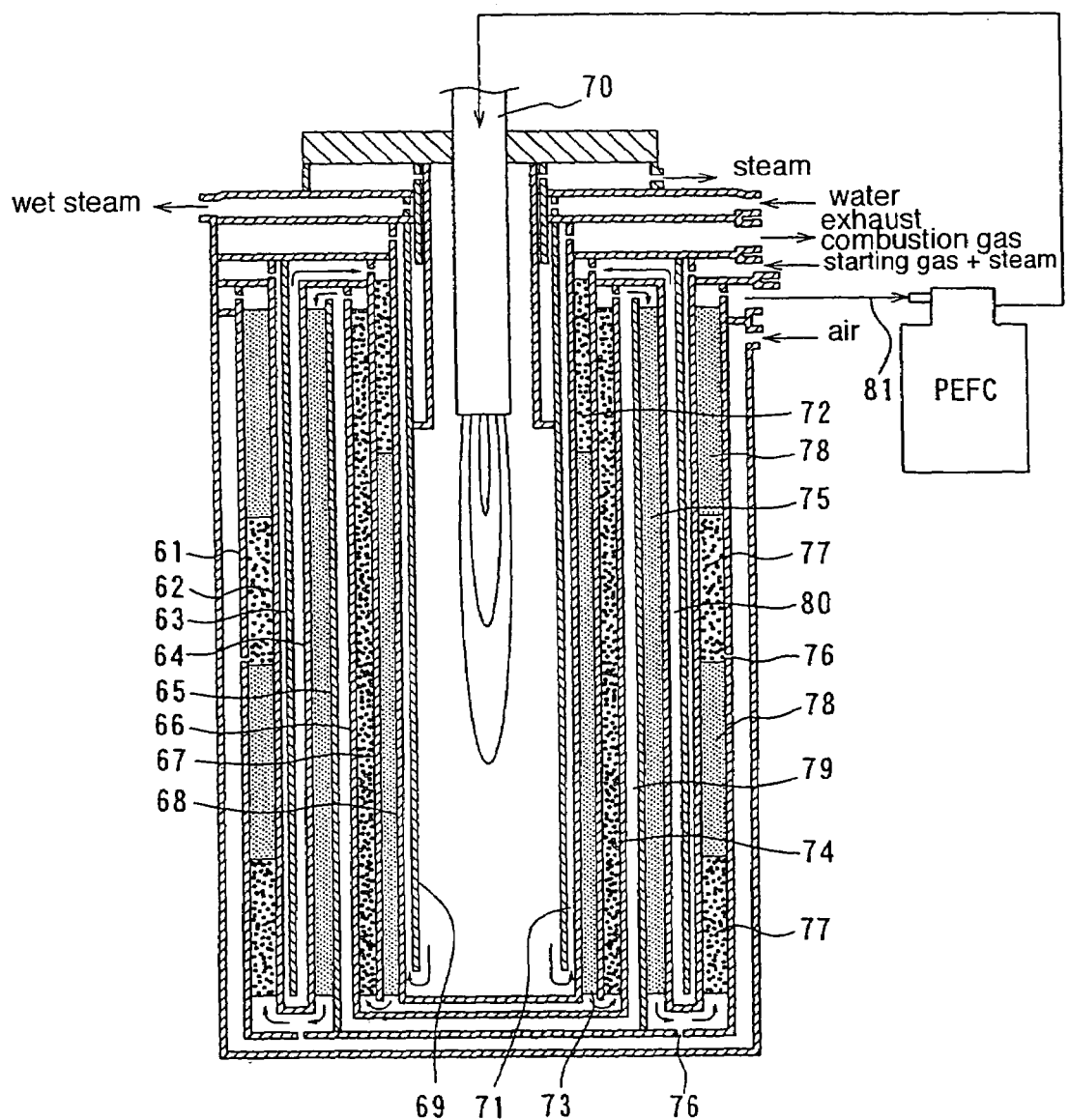
FIG. 5 is a view showing a conventional cylindrical reforming unit.

Embodiments of a first cylindrical reforming unit and a second cylindrical reforming unit according to the invention are successively described. The embodiment of the first cylindrical reforming unit is hereinafter referred to as reforming unit A and the embodiment of the second cylindrical reforming unit is referred to as reforming unit B.

Embodiment of First Cylindrical Reforming Unit

FIGS. 1 and 2 are, respectively, a longitudinal sectional view showing an embodiment of a first cylindrical reforming unit (reforming unit A) according to the invention. FIG. 2 is a view showing an upper portion of FIG. 1 as enlarged.

This reforming unit A is constituted of a plurality of cylindrical bodies of different diameters disposed about the same central axis in multiple, spaced relationship. More particularly, a first cylindrical body (1), a second cylindrical body (2) and a third cylindrical body (3) of successively increasing diameters are concentrically disposed in spaced relationship with one another. A cylindrical heat transfer partition wall (4), i.e. a radiation cylinder (4), is disposed in the first cylindrical body (1) as having the same central axis and is smaller in diameter than the first cylindrical body (1). A burner (5) is disposed within the radiation cylinder (4). The burner (5) is attached to the inside of the radiation cylinder (4) through an upper cover-burner mount (6).

The radiation cylinder (4) is disposed in spaced relationship between the lower end thereof and a bottom plate (7) of the first cylindrical body (1). This space and a gap associated therewith and established between the radiation cylinder (4) and the first cylindrical body (1) form an exhaust gas passage (8) of a combustion exhaust gas from the burner (5). The exhaust gas passage (8) communicates, at the upper portion thereof, with an outlet (10) of the combustion exhaust gas through a space between an upper cover (9) of the exhaust gas passage (8) and an upper cover (13) of a preheating layer (14), from which the combustion exhaust gas is discharged.

The preheating layer (14) and a reforming catalyst layer (15) are disposed in the space between the fist cylindrical body (1) and the second cylindrical body (2). The preheating layer (14) is associated with a mixing chamber (12), which is, in turn, in association with a feed port (11) of a starting gas. The mixing chamber (12) is formed between an upper cover (13) of the preheating layer (14) and an upper cover (20) of the CO removal catalyst layer (19). The starting gas is fed from a feed port (11) and mixed with water (steam) in the mixing chamber (12), and is introduced into the reforming catalyst layer (15) via the preheating layer (14) and reformed therein. The first cylindrical body (2) is disposed in spaced relationship between the lower end thereof and a bottom plate (22) of the third cylindrical body (3).

A CO shift catalyst layer (16), an air mixing chamber (17) and a CO removal catalyst layer (19) are, respectively, disposed in a space between the second cylindrical body (2) and the third cylindrical body (3). Air is supplied from an air feed port (18) to the air mixing chamber (17), and the supplied air is mixed, in the air mixing chamber (17), with a reforming gas passed through the CO shift catalyst layer (16). The reforming gas passed through the CO removal catalyst layer (19) is withdrawn from an outlet (21) for reforming gas. The CO removal catalyst layer may also be called a PROX layer.

The reforming unit A is provided, at the side surface thereof, with a water feed port (23) aside from the outlet port (10) for combustion exhaust gas, feed port (11) for starting gas, air feed port (18) for CO removal and outlet (21) for reformed gas as set out hereinabove. The water feed portion (23) is in communication with a feed water preheater (24). The feed water preheater (24) has a connection pipe (25) connected at a position opposite to the water feed port (23). The feed water preheater (24) is connected to a heat transfer tube (26) (water heating tube (26) and cooling tube (26)) via the connection tube (25).

The heat transfer tube (26) is spirally wound around the third cylindrical body (3). The heat transfer tube (26) constitutes a so-called boiler and is connected to a tube (27) at an end thereof, and the tube (27) is connected to the mixing chamber (12). The starting gas and steam are mixed in the mixing chamber (12). The tube (27) constitutes part of the heat transfer tube (26).

The heat transfer tube (26) which is constituted of one pass, i.e. a single continuous hollow tube, can avoid the occurrence of disturbance of split flows which will be caused in cases where the tube is constituted of a plurality of passes. In FIG. 1, the heat transfer tube (26) starts to be wound down from the upper portion and is successively wound downwardly, which is not always the case. For instance, the end portion of the connection tube (25) may be laid down to an extent below the reforming unit A, and spirally wound up successively from the lower portion.

The heat transfer tube (26) is so designed as to have a tube diameter which allows a flow rate of a liquid phase of a medium (i.e. water, or water and steam) passing through the tube to be 0.1 m/second or over, preferably 1 m/second or over. This enables one to prevent the medium from pulsating. It will be noted that although the medium itself is heated, it cools the CO shift catalyst layer (16) and the CO removal catalyst layer (19) and, in this sense, serves as a cooling medium. The cooling medium has a two-phase stream of water and steam within the heat transfer medium (26), and the flow accompanied by pulsation, such as of a stratified flow, a wavy flow, a slag flow, a froth flow or the like, is generated at a quality of vapor ranging from about 0~20%. The pulsation of the cooling medium renders the reforming reaction instable. When the flow rate of the cooling medium is at 1 m/second or over as defined hereinabove, the difference in average flow rate between water and steam becomes small, thus making it possible to suppress the pulsation. In particular, where the heat transfer tube (26) is wound along the horizontal direction or substantially along the horizontal direction as in the reforming unit A, the flow rate of 1 m/second or over leads to a more stable reforming reaction.

Heat transfer-promoting fillers having a given shape such as alumina balls, a mesh-shaped metal and the like may be packed in the heat transfer tube (26). The packing of such a filler is advantageous in that water is in contact with the entire inner surfaces of the heat transfer tube (26) and the interface between water and steam increases, so that the temperature difference inside the tube, particularly, along the periphery of the tube is mitigated and thus, the pulsation of the two-phase stream of water and steam can be prevented.

The gap formed between the first cylindrical body (1) and the second cylindrical body (2) has the preheating layer (14) in the upper portion thereof and the reforming catalyst layer (15) in the lower portion thereof. The preheating layer (14) is opened at an upper portion thereof to the mixing chamber (12) connected with the feed portion (11) for the starting gas and the tube (27). A starting gas and steam (or steam and water) pass from the mixing chamber (12) through the opening to the preheating layer (14). For the starting gas, a hydrocarbon fuel such as a city gas, LPG, a natural gas or the like is used. In cases where the hydrocarbon fuel contains sulfur compounds, the fuel is supplied after having been desulfurized beforehand.

The preheating layer (14) is packed with a filler of a given shape such as alumina balls, a mesh-shaped metal or the like. This permits the starting gas and steam (or steam and water) passing through the preheating layer (14) to be efficiently heated. The flow rate is accelerated by the action of the filler being packed, so that the pulsation of the two-phase stream of the starting gas and steam and water can be prevented.

The reforming catalyst layer (15) is packed with a catalyst for reforming a starting gas with steam, and communicates at the lower portion thereof with the lower end of the CO shift catalyst layer (16) through a space formed between a bottom plate (7) of the first cylindrical body (1) and the bottom plate (22) of the third cylindrical body (3). More particularly, the space forms a passage of a reformed gas produced in the reforming catalyst layer (15) and thus, the reforming catalyst layer (15) and the CO shift catalyst layer (16) are directly connected with each other. For the reforming catalyst, any type of catalyst that is able to reform a starting gas with steam is usable without any limitation. For instance, a Ni or Ru-based metal catalyst is used. These metal catalysts are so arranged that a metal catalyst such as NI or Ru is supported on a carrier such as alumina. With methane gas used, for example, as a starting gas, the gas is reformed according to the following reaction (I) in the reforming catalyst layer (15)

$$CH_4 + H_2O \rightarrow CO + 3H_2 \quad \text{(I)}$$

The reforming reaction in the reforming catalyst layer is an endothermic reaction and proceeds by absorption of the heat of combustion of the burner (5). More particularly, when the combustion exhaust gas from the burner (5) passes through the exhaust gas passage (8) established between the heat transfer partition wall (4) and the reforming catalyst layer (15), the heat of the combustion exhaust gas is absorbed with the reforming catalyst layer (15), whereupon the reforming reaction is carried out.

A monolithic reforming catalyst may be used, aside from a granular reforming catalyst, as the reforming catalyst in the reforming catalyst layer (15). The reforming catalyst is used at a temperature as high as about 700° C. If the reforming unit is used, for example, in a domestic co-generation system (co-generator system), it is necessary to carry out starting up and stopping operations frequently. Where a granular reforming catalyst is used, a problem arises in that the catalyst packed in the reforming catalyst layer is crushed and broken into pieces by repetition of temperature rising and falling, so that the catalytic activity lowers. To avoid this, a monolithic reforming catalyst is used as a reforming catalyst so that the problem, which will be encountered when a granular reforming catalyst is used, can be solved.

The monolithic reforming catalyst (=honeycomb-shaped reforming catalyst) is one wherein a catalyst and a fixed bed are integrally formed, i.e. a metal catalyst such as Ni or Ru is supported on the inner surfaces of cells of a ceramic carrier or metal carrier having a great number of parallel through-holes, or cells. The monolithic catalyst can withstand vibrations or high-temperature environments and are in frequent use, mainly, as an exhaust gas purification catalyst for a motor vehicle.

In the practice of the invention, the monolithic reforming catalyst is disposed singly or plurally in the reforming catalyst layer (15) for use as a reforming catalyst as a whole. This is true of not only the first cylindrical reforming unit, but also the second cylindrical reforming unit described hereinafter.

FIG. 3 is a view showing an embodiment where a monolithic catalyst is disposed. This monolithic catalyst is placed in the reforming catalyst layer (15) established between the first cylindrical body (1) and the second cylindrical body (2). Where the monolithic reforming catalyst is used, the catalyst does not settle down when suffering thermal displacement such as by expansion and contraction of the first cylindrical body (1), so that the settlement and division into pieces of the granules of catalyst as will be caused with the case of a granular reforming catalyst can be suppressed. Mention is made of cordierite as an example of a ceramic material constituting the carrier of the monolithic reforming catalyst. Examples of the metal constituting the carrier include stainless steels.

If a cushioning material capable of absorbing the thermal displacement is placed between the monolithic reforming catalyst and the first cylindrical body (1), the thermal displacement on the monolithic catalyst can be further suppressed. A wire mesh may be used as the cushioning material. The use of a metal having good heat transferability as a mesh material is convenient as not lowering heat transferability.

The CO shift catalyst layer (16) packed with a CO shift catalyst, the air mixing chamber (17) for CO removal and the CO removal catalyst layer (19) are disposed, in ascending order of layers, in the gap formed between the second cylindrical body (2) and the third cylindrical body (3). In the CO shift catalyst layer (16), the following CO shift reaction, i.e. the water gas shift reaction (II), is carried out wherein CO present in a reforming gas is converted into carbon dioxide along with the generation of hydrogen.

$$CO + H_2O \rightarrow CO_2 + H_2 \quad \text{(II)}$$

For the CO shift catalyst in the CO shift catalyst layer (16), a catalyst mainly composed of platinum is used. The catalyst mainly composed of platinum is constituted by supporting platinum on a carrier such as alumina or the like. The catalyst mainly composed of platinum is unlikely to undergo degradation such as by oxidation and can be continuously employed within a high temperature range of 350° C. or over, especially within a high temperature range of 400° C. or over, thereby permitting the reaction to proceed at a higher rate. In this case, mere application of a platinum-based catalyst to the CO shift reaction may cause a side reaction called a methanation reaction (III) indicated below in a high temperature range, thereby impeding the intended CO shift reaction $$CO + 3H_2 \rightarrow CH_4 + H_2O \tag{III}$$

To avoid this, for the CO shift catalyst in the CO shift catalyst layer (16), a catalyst, which is composed of a major component of platinum along with a metal oxide such as $CeO_2$ or the like used as an minor component, is used. This permits the methanation reaction to be suppressed from occurring in a high temperature range. For the CO shift catalyst containing platinum as a major component and a metal oxide as a minor component, a CO shift catalyst called "AD catalyst" available from Matsushita Electric Industrial Co., Ltd., is known.

Moreover, Fe/Cr-based high temperature CO shift catalysts may also be used as the CO shift catalyst. In addition, high temperature CO shift catalysts where base metals such as Al, Cu, Fe, Cr, Mo and the like are supported on a carrier such as of Zr may also be used. It will be noted that the high temperature CO shift catalyst may be used in combination with a low temperature CO shift catalyst.

The air mixing chamber (17) for CO removal is established by means of a partition board (28) and a partition board (30), to which an air feed tube (18) is connected. The partition board (28) is provided with a plurality of holes (29), and the partition board (30) is provided with a plurality of holes (31). The CO removal catalyst layer (19) is filled with a CO removal catalyst (=PROX catalyst), and a CO removal reaction is carried out by means of the PROX catalyst to an extent that the content of CO is reduced to ppm level. For the CO removal catalyst, any type of catalyst capable of selectively oxidizing CO in a reforming gas can be used without limitation and for example, a Ru-based metal catalyst is used. The metal catalyst is constituted, for example, by supporting a metal catalyst such as Ru on a carrier such as alumina. The reaction in the CO removal catalyst layer (19) proceeds according to the following formula (IV).

$$2CO + O_2 \rightarrow 2CO_2 \tag{IV}$$

The reforming gas from which CO has been removed in the CO removal catalyst layer (19) is withdrawn from a withdrawal port (21) of reformed gas through the plurality of holes (33) of the partition board (32).

The withdrawal port (21) of reformed gas is connected to a fuel gas feed tube which is in turn connected, for example, to a polymer electrolyte fuel cell (PEFC, not shown). In this case, the reformed gas containing a predetermined concentration of hydrogen is supplied to a fuel electrode side of a polymer electrolyte fuel cell and is used as a fuel for power generation. The offgas from the fuel electrode of the polymer electrolyte fuel cell may be used as a fuel gas for combustion with the burner (5).

As stated hereinbefore, the heat transfer tube (26) is spirally wound about the periphery of the third cylindrical body (3), and a heat insulating material (34) is disposed around the periphery, thereby preventing heat from dissipating to outside. For the heat insulating material (34), heat insulating materials having a good heat insulating effect such as, for example, microtherm, calcium silicate, alumina fibers and the like are employed.

Next, the operations of this reforming unit A, i.e. startup operation and steady operation, are now illustrated.

Startup Operation

Water for reforming is supplied from the feed port (23), and the burner (5) is ignited to heat the inside of the reforming unit A. The burner (5) is able to heat the heat transfer partition wall (4) by application of heat of radiation from the flame, and the combustion exhaust gas passes through the passage (8) between the heat transfer partition wall (4) and the first cylindrical body (1). In this way, the reforming catalyst layer (15), preheating layer (14) and feed water preheater (24) are, respectively, heated. The combustion exhaust gas is discharged from an outlet (10).

Water is heated in the water preheater (24), after which it arrives at the heat transfer tube (26) via the connection tube (25) and is evaporated into steam while spirally swirling about the lower periphery of the third cylindrical body (3) whose temperature rises quickly. On the other hand, a starting gas is supplied from the feed port (11) and mixed in the mixing chamber (12) with steam from the heat transfer tube (26), followed by passing to the preheating layer (14). The starting gas effectively absorbs the heat of combustion at the burner (5) with the aid of the heat transfer promoting effect of a filler packed in the preheating layer (14) and is thus heated to a given temperature necessary for the reforming reaction, followed by passing into the reforming catalyst layer (15) where the gas is reformed. When the reforming reaction in the reforming catalyst layer (15) comes close to equilibrium, the resulting reformed gas exits from the lower portion of the reforming catalyst layer (15) and turns up at the lower end thereof, followed by passage into the CO shift catalyst layer (16).

The CO shift reaction in the CO shift catalyst layer is an exothermic reaction, and the reaction commences from about 200° C., like a Cu—Zn-based catalyst. Heat which is larger than the heat of evaporation required in the outside heat transfer tube (26) is received from the heat transfer from the reforming catalyst layer (15) and the heat transmission from the reformed gas produced in the reforming catalyst layer (15), so that the CO shift catalyst layer (16) is heated successively from the upstream side, i.e. from the lower portion of the CO shift catalyst layer (16). The reformed gas passing through the CO shift catalyst layer (16) is discharged through the holes (29) and the air mixing chamber (17) and the holes (31) into the CO removal catalyst layer (19). After removal of CO by the CO removal reaction in the CO removal catalyst layer (19), the reformed gas is withdrawn from the withdrawal port (21) through a multitude of holes (33) provided along the periphery of the partition board (32).

In this manner, the reforming unit A is provided with the CO shift catalyst layer (16) and the CO removal catalyst layer (19) around the reforming catalyst layer (15) without interposing a heating insulating layer, a cooling mechanism and the like. Thus, the heat of combustion of the burner (5) is able to raise the temperatures of the CO shift catalyst layer (16) and the CO removal catalyst layer (19) within a relatively short time and contributes to the generation of the required steam. The combustion exhaust gas from the burner (5) runs and passes between the heat transfer partition wall (4) and the first cylindrical body (1), so that heat contained in the combustion exhaust gas can be effectively absorbed, resulting in fuel savings in the course of startup operation. In other words, according to the reforming unit A, the unit can be raised to a temperature necessary for startup operation within a short time, fuel can be saved, and a very quick startup operation can be performed.

Steady Operation

The temperatures at the respective portions of the reforming unit A arrive at predetermined levels, respectively, thereby reaching a steady state, whereupon water supplied from the feed port (23) is heated in the feed water preheater (24) and absorbs the heat of reaction in the CO shift catalyst layer (16) and the CO removal catalyst layer (19) at the heat transfer tube (26), resulting in a saturated vapor. The flow rate of the cooling medium within the heat transfer tube (26) is 0.1 m/second or over, so that pulsation is suppressed and smooth passage is realized. The saturated vapor and the starting gas are heated, in the preheating layer (14), to a temperature necessary for the reforming reaction in the reforming catalyst layer (15).

The reformed gas reformed in the reforming catalyst layer (15) flows out from the lower portion of the reforming catalyst layer (15), turns back and passes from the lower portion of the CO shift catalyst layer (16) into the CO shift catalyst layer (16). The CO shift catalyst layer (16) arrives at 400° C. or over at the lower portion thereof, i.e. in the vicinity of the inlet of the CO shift catalyst layer (16), by the heat transfer from the reforming catalyst layer (15), self generation of heat and sensible heat. The temperature lowers toward the upper portion by heat absorption with the heat transfer tube (26) and the preheating layer (14) and is at about 200° C. in the vicinity of the outlet.

The reformed gas passed through the CO shift catalyst layer (16) contains about 0.5% of CO and passes into the air mixing chamber (17). Air for CO removal is introduced from the feed port (18) into the mixing chamber (17), in which the reformed gas and air are mixed during the course of the passage thereof, followed by passage into the CO removal catalyst layer (19). In the CO removal catalyst layer (19), CO in the reformed gas is selectively oxidized. The reformed gas obtained after removal of CO through the oxidation reaction of CO in the CO removal catalyst layer (19) becomes a gas which contains, for example, 75% of hydrogen, 2% of methane, 20% of carbon dioxide, 3% of nitrogen and not larger than 10 ppm of carbon monoxide, and is withdrawn from the withdrawal port (21). The reformed gas has a carbon monoxide concentration of 10 ppm or below and can be used, for example, as a fuel for a polymer electrolyte fuel cell.

The heat transfer tube (26) functions as a so-called boiler wherein water (or wet saturated vapor) is vaporized. The CO shift catalyst layer (16) and the CO removal catalyst layer (19), respectively, permit an exothermic reaction to proceed and the temperatures therein to rise. The CO shift catalyst layer (16) is cooled down to about 200° C. in the vicinity of the outlet thereof by the influence of the heat of evaporation of water in the heat transfer tube (26), and the CO removal catalyst layer (19) is cooled down to about 100° C.

In this way, water is heated and evaporated by application of heat of the CO shift catalyst layer (16) and the CO removal catalyst layer (19), so that the fuel of the burner (5) for generating steam can be saved and it is not necessary to separately provide a boiler or the like, thereby enhancing the thermal efficiency of the reforming unit. Because a starting gas and steam having low temperatures are successively supplied to the preheating layer (14), the temperature in the vicinity of the inlet thereof is kept relatively low. Thus, the CO removal catalyst layer (19) can be prevented from overheating.

A platinum-based CO shift catalyst is usable at high temperatures and exhibits a high heat resistance, and allows the reaction to proceed in a high temperature range of 350° C. or over, especially in a high temperature range of 400° C. or over. Accordingly, the CO shift catalyst layer (16) is made high in temperature in the vicinity of the inlet thereof, thereby enabling the conversion of CO (i.e. the CO shift reaction) to proceed quickly. This ensures a reduced amount of a CO shift catalyst to be packed and a reduced size of the reforming unit body.

Because the temperature in the vicinity of the outlet of the CO shift catalyst layer (16) is lowered to about 200° C., a high CO conversion rate is obtained, depending on the outlet temperature. Moreover, when a metal oxide such as $CeO_2$ is added to the platinum-based CO shift catalyst as a minor component, the methanation reaction can be suppressed, even under high temperature conditions. Where a base metal-based catalyst, i.e. a high temperature CO shift catalyst wherein a base metal such as Al, Cu, Fe, Cr, Mo or the like is supported on a carrier such as Zr, is used, the methanation reaction can be prevented beforehand.

While the temperature in the CO removal catalyst layer (19) is kept at about 100° C., unfavorable side reactions including methanation reactions and reverse shift reactions can be suppressed from occurring. In addition, the reformed gas is uniformly mixed with air, under which an unnecessary loss of hydrogen as will be caused by the occurrence of a local high oxygen concentration can be prevented.

As stated hereinabove, according to the reforming unit A, a platinum-based catalyst capable of application at high temperatures is used as a CO shift catalyst in the CO shift catalyst layer (16), and thus, the CO shift catalyst layer (16) can be directly disposed around the reforming catalyst layer (15). This enables one to make a small-sized and light-weight reforming unit and also to shorten the startup time. Further, the heat of reaction and sensible heat of the CO shift catalyst layer (16) and the CO removal catalyst layer (19) can be recovered with the heat transfer tube (26) and thus, a high thermal efficiency can be realized.

Embodiment of Second Cylindrical Reforming Unit

FIG. 4 is a longitudinal sectional view showing an embodiment of a second cylindrical reforming unit (reforming unit B) according to the invention. The reforming unit B is described mainly with respect to the difference from the reforming unit A and those which are same as and common to the reforming unit A are not described again except when necessary.

In the reforming unit B, the heat transfer tube (26) serving also as a feed water preheater is wound around the upper cover-burner mount (6) for holding the burner (5) as coming substantially to full circle. The heat transfer tube (26) substantially makes the circuit of the periphery of the upper cover-burner mount (6) and arrives via a connection tube (25) at a lower end of a heat-insulating member (44) described hereinafter, and is connected to a starting gas feed tube (11) while spirally ascending the periphery thereof. Like the reforming unit A, the reforming unit B is so arranged with respect to the preheating layer (14) that the preheating layer (14) is provided at an upper portion between the first cylindrical body and the second cylindrical body and the reforming catalyst layer (15) is provided at a lower portion contiguous to the upper portion. With the reforming unit B, a round bar (41) is spirally disposed inside the preheating layer (14), so that one continuous spiral passage is established within the preheating layer (14).

Further, a heat recovery layer (42), a CO shift catalyst layer (16) and a CO removal catalyst layer (19) are, respectively, disposed at the downstream side of the reforming catalyst layer (15), i.e. between the second cylindrical body (2) and the third cylindrical body (3). The heat recovery layer (42) has a plurality of round bars (43) spirally disposed therein. The inner space of the heat recovery layer (42) is spirally divided off by means of the plural round bars (43), thereby establishing a plurality of spiral passages therein. The length of the spiral passage in the heat recover layer (42) is one which is sufficient to render the temperature of the reformed gas flowing into the CO shift catalyst layer (16) not higher than the heat-resistant temperature of a CO shift catalyst.

Although the catalyst packed in the CO shift catalyst layer (16) may be a conventional one (i.e. a Cu/Zn-based low temperature CO shift catalyst or the like), the use of a catalyst which can be used continuously at least at 350° C. or over (i.e. a platinum-based or Fe/Cr-based high temperature CO shift catalyst or the like) enables one to shorten the length of the heat recovery layer (42) and the CO shift catalyst layer (16) and make these layers small in size, thereby realizing a small-sized, light-weight reforming unit as a whole.

The CO shift catalyst layer (16) is provided between the second cylindrical body (2) and the third cylindrical body (3) and is disposed with the heat insulating member (44) therearound. The heat insulating member (44) is wound therearound with the heat transfer tube (26) via a circular cylindrical body constituted of a thin sheet (45). More particularly, the heat insulating member (44) is disposed between the third cylindrical body (3) and the circular cylindrical body made of the thin sheet (45) and serves as a cooling mechanism for indirectly cooling the CO shift catalyst layer (16) by means of the heat transfer tube (26). For the insulating member, those having good processability, such as ceramic fibers, are used. The heat insulating member, such as ceramic fibers, is wound in a thickness which allows the temperature of the CO shift catalyst layer (16) to be uniformly kept at an appropriate level without lowering in excess by the cooling action of the heat transfer tube (26). The heat transfer tube (26), including the heat transfer tube (26) serving as the feed water preheater, has the function of a boiler and establishes one continuous passage, with no local stagnation as will occur in plural passages.

The CO shift catalyst layer (16) is partitioned at lower and upper portions thereof with a partition board (46) and a partition board (47), and the partition board (47) is formed with a plurality of holes (48) at equal intervals along the circumferential direction. A partition board (49) is also disposed above the partition board (47) at a given space therebetween, and air for CO removal is supplied via the feed tube (18) to the space between both partition boards. A circular passage (50) is disposed above the partition board (49), and the space between the partition board (47) and the partition board (49) and the passage (50) mutually communicate through a hole (51) of a given diameter. When the hole (51) is provided as having the given diameter and one in number, a predetermined passage rate is obtained upon passage of the reformed gas and the air for CO removal, under which the reformed gas and the air for CO removal can be well mixed through the turbulent flow in the course of the passage.

The passage (50) communicates with the CO removal catalyst layer (19) through a plurality of holes (52) uniformly disposed along the circumference of the unit. The CO removal catalyst layer (19) is packed with such a catalyst as in the reforming unit A. The CO removal catalyst layer (19) is in communication with the withdrawal port (11) of the reformed gas through a plurality of holes (54) uniformly formed along the periphery of the partition board (53) serving as an upper cover thereof. The CO removal catalyst layer (19) is surrounded by the third cylindrical body and is directly, spirally wound therearound with the cooling tube (26), i.e. the heat transfer tube (26).

In the reforming unit B, the heat recovery layer (42) is disposed upstream of the CO shift catalyst layer (16), which makes it possible to lower the temperature of the reformed gas flowing into the CO shift catalyst layer (16) to a given level. For instance, when a city gas (13A) is used for operation at a low steam ratio of S/C=3.5 or below, the temperature of the reformed gas from the reforming catalyst layer (15) is at about 700° C. In such a case, the reformed gas can pass into the CO shift catalyst layer (16) through the heat recovery layer (42), so that the temperature can be lowered to 600° C. or below, which does not exceed the heat-resistant temperature of the CO shift catalyst layer. The temperature of the reformed gas can be made to be not higher than the heat-resistant temperature of the CO shift catalyst by means of the heat recovery layer (42), and the reforming temperature in the reforming catalyst layer (15) can be raised. In this way, a starting gas, i.e. a hydrocarbon gas of C1 to C3 or C4 can be reformed satisfactorily.

Furthermore, in the reforming unit B, a CO shift catalyst such as a Cu/Zn-based low temperature CO shift catalyst mainly composed of base metals, an Fe/Cr-based high temperature CO shift catalyst or the like may be used. Although Cr has a toxicity and needs costs for waste disposal, a high temperature CO shift catalyst wherein Cr is replaced by Al is easy in disposal with the environmental burden being small. A CO shift catalyst composed mainly of Cu and Al exhibits activity higher than the Fe/Cr-based one and may be used for this purpose. It is known that the Cu/Zn-based low temperature CO shift catalyst is degraded by oxidation. Low temperature CO shift catalysts using base metals other than Cu/Zn are reported as having a high oxidation resistance, and such catalysts may be used.

When two or more of such base metal-based CO shift catalysts may be appropriately used, continuous use within a range of 200° C. to 600° C. is possible. Accordingly, a side reaction called a methanation reaction can be suppressed from occurring and CO shift catalysts having a good oxidation resistance can be realized.

EXAMPLE

The invention is described in detail by way of example, which should not be construed as limiting the invention thereto. This example was carried out by use of the reforming unit A shown in FIG. 1. PEFC (polymer electrolyte fuel cell with output power=1 to 1.2 kW) was connected to the reforming unit A wherein a reformed gas prepared in the reforming unit A was used as a fuel of the PEFC.

The respective types of catalysts were packed in the reforming catalyst layer, CO shift catalyst layer and CO removal catalyst layer, and temperature sensors were, respectively, disposed in these layers as usual. For a reforming catalyst, a ruthenium catalyst (i.e. a catalyst supporting Ru on granular alumina) was used. The CO shift catalyst used included a platinum catalyst (i.e. a catalyst supporting Pt on granular alumina) at a high temperature portion of the CO shift catalyst layer and a Cu/Zn catalyst (i.e. a catalyst supporting Cu and Zn on granular alumina) at a lower temperature portion. For the CO removal catalyst, a ruthenium catalyst (i.e. a catalyst supporting Ru on granular alumina) was used.

A desulfurized city gas (13A) was used as a starting gas and supplied at a flow rate of 4.1 NL/minute (calorie=2682 Kcal/hour), and water (pure water) was supplied at a flow rate of 10.0 g/minute, with a steam ratio (S/C ratio)=2.5. Air for CO removal was fed at a rate of 1.5=NL/minute. The fuel for the burner used was a city gas only during the startup operation and an anode offgas (fuel electrode offgas) from PEFC was used in the course of steady operation. The flow rate of the anode offgas was at 10.5 NL/minute (on a dry basis), the calorific value was 1.4 NL/minute when calculated as the city gas (13A) fuel. In this manner, a reformed gas was obtained at a flow rate (on a dry basis) of 23.1 NL/minute. The consumption of hydrogen at the PEFC stack was at about 75%.

Table 1 indicates the temperatures of the respective catalysts in the reforming catalyst layer, CO shift catalyst layer and CO removal catalyst layer, which were measured during the steady operation.

TABLE 1

| | |
|---|---|
| Reforming catalyst | 451 to 683° C. |
| CO shift catalyst (at high temperature portion) | 298 to 445° C. |
| CO shift catalyst (at low temperature portion) | 221 to 298° C. |
| CO removal catalyst | 128 to 224° C. |

EFFECT OF THE INVENTION

According to the cylindrical steam reforming units of the invention, the following effects are obtained.

①  A CO shift catalyst layer and a CO removal catalyst layer (=PROX layer) are, respectively, disposed directly on the outer periphery of a reforming catalyst layer without formation of any heat insulating layer and the like, so that the reforming unit itself can be made small in size. Because the heat from the burner is readily transmitted to the CO shift catalyst layer and the CP removal catalyst layer, the startup time can be remarkably shortened.

②  The provision of a heat transfer tube for vaporizing water for reforming around the CO shift catalyst layer and the CO removal catalyst layer contributes to keeping the CO shift catalyst layer and the CO removal catalyst layer at given temperatures, respectively, and the thermal efficiency of the reforming unit can be improved through heat recovery of the heat transfer tube.

③  When the flow rate of a liquid phase of a cooling medium (water and steam) within the heat transfer tube is set at 0.1 m/second or over, pulsation can be prevented, permitting the cooling medium of two-phase steams to smoothly pass.

④  The heat recovery layer is provided upstream of the CO shift catalyst layer, so that a CO shift catalyst of a relatively low heat-resistant temperature can be used without resorting to any specific type of catalyst. In this sense, the cost of the catalyst can be reduced.

⑤  The provision of the heat transfer tube around the CO shift catalyst layer through a heat insulating member can prevent overcooling of the CO shift catalyst layer to keep and contributes to keeping an appropriate temperature, and allows a uniform temperature without a temperature difference to be maintained. This permits the heat of a combustion exhaust gas and a reformed gas to be efficiently absorbed, thereby improving the thermal efficiency by use of a simple structure.

⑥  Air can be mixed in the CO removal catalyst layer, so that CO can be stably reduced. Bar members partitioning passages of the preheating layer are spirally disposed and a filler such as alumina balls is packed, so that pulsation with a two-phase stream of water and steam can be prevented. Because the starting gas and steam can be well mixed, stable preparation of the reformed gas becomes possible.

⑦  Because the concentration of carbon monoxide in the resulting reformed gas can be reduced to a predetermined level or below, the unit can be used as a hydrogen generator of a polymer electrolyte fuel cell. In this case, as set out in ① above, the reforming unit per se can be made small in size, thereby enabling one to constitute a small-sized fuel cell system having a high efficiency.

The invention claimed is:

1. A cylindrical steam reforming unit comprising:
(a) a first cylindrical body, a second cylindrical body and a third cylindrical body disposed concentrically in spaced-apart relationship and successively increasing in diameter, said first and third cylindrical bodies both having a bottom plate;
(b) a radiation cylinder disposed inside of said first cylindrical body in spaced-apart relationship therewith and having a central axis concentric with said first cylindrical body;
(c) a burner disposed at a radial central portion of said radiation cylinder;
(d) a reforming catalyst layer provided in a first space between the first cylindrical body and the second cylindrical body and a preheating layer disposed in the first space between the first cylindrical body and the second cylindrical body upstream of the reforming catalyst layer for preheating a starting gas;
(e) a heat recovery layer provided in a second space between the second cylindrical body and the third cylindrical body, said second space being in communication with the first space and the heat recovery layer being situated with respect to the reforming catalyst layer such that heat contained in a reformed gas can be transferred to the reforming catalyst layer;
(f) a CO shift catalyst layer provided between the second cylindrical body and the first cylindrical body downstream of the heat recovery layer; and
(g) a CO removal catalyst layer provided downstream of the CO shift catalyst layer and in communication therewith,
wherein a combustion exhaust gas generated in said burner within the radiation cylinder reverses its direction of flow between an end portion of the radiation cylinder and the bottom plate of the first cylindrical body and flows into a third space provided between the radiation cylinder and the first cylindrical body in a direction opposite to the flow of the starting gas through the reforming catalyst layer;
the preheating layer is positioned at an outer periphery of the radiation cylinder and the CO shift catalyst layer is positioned at an outer periphery of the preheating layer;
a reformed gas generated in the reforming catalyst layer reverses its direction of flow between an end portion of the second cylindrical body and the bottom plate of the third cylindrical body, flows into the heat recovery layer, collects heat from the reforming catalyst layer and subsequently flows into the CO shift catalyst layer; and the reformed gas passes through the CO removal catalyst layer after passing through the CO shift catalyst layer.

2. The cylindrical steam reforming unit according to claim 1, wherein a continuous round bar is spirally disposed in the first space containing said preheating layer and forms a spiral passage.

3. The cylindrical steam reforming unit according to claim 1, wherein a plurality of continuous round bars are spirally disposed in the second space containing said heat recovery layer and form a spiral passage, the length of said spiral passage being sufficient to render the temperature of the reformed gas flowing into the CO shift catalyst layer not higher than the heat-resistant temperature of the CO shift catalyst.

4. The cylindrical steam reforming unit according to claim 1, wherein said CO shift catalyst in said CO shift catalyst layer is one which can be used continuously at a temperature of at least 350° C.

5. The cylindrical steam reforming unit according to claim 1, wherein in said CO shift catalyst layer, a high temperature CO shift catalyst is disposed at the side of said reforming catalyst layer and a low temperature CO shift catalyst is disposed at the site of said CO removal catalyst layer.

6. The cylindrical steam reforming unit according to claim 1, wherein said CO shift catalyst layer is filled with a CO shift catalyst in an amount sufficient to carry out a CO shift reaction.

7. The cylindrical steam reforming unit according to claim 1, wherein a heat transfer tube for cooling said CO shift catalyst layer is spirally wound around an outer wall of said CO shift catalyst layer and water used for a reforming reaction in said reforming catalyst layer passes through said heat transfer tube to cool said CO shift catalyst layer.

8. The cylindrical steam reforming unit according to claim 1, wherein a heat insulating member layer is provided around the outer wall of said CO shift catalyst layer, a heat transfer tube for cooling said CO shift catalyst layer is spirally wound around an outer periphery of said heat insulating member layer and water used for a reforming reaction passes through said heat transfer tube.

9. The cylindrical steam reforming unit according to claim 1, comprising a feed water preheating unit comprising means for performing heat exchange with a combustion exhaust gas upstream of a heat transfer tube to preheat water introduced into said reforming catalyst layer.

10. The cylindrical steam reforming unit according to claim 1, comprising a feed water preheating unit comprising means for performing heat exchange with a combustion exhaust gas upstream of a heat transfer tube to preheat water introduced into said reforming catalyst layer, said feed water preheating unit being formed by winding said heat transfer tube around an outer face of said reforming unit in the vicinity of a combustion exhaust gas outlet from which a combustion exhaust gas passes out.

* * * * *